US012481985B2

(12) United States Patent
Muñoz De La Torre Alonso et al.

(10) Patent No.: US 12,481,985 B2
(45) Date of Patent: Nov. 25, 2025

(54) CLASSIFYING TRAFFIC DATA (71) Applicant: Telefonaktiebolaget LM Ericsson (publ), Stockholm (SE)

(72) Inventors: Miguel Angel Muñoz De La Torre Alonso, Madrid (ES); Miguel Angel Puente Pestaña, Madrid (ES)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 316 days.

(21) Appl. No.: 17/784,815

(22) PCT Filed: Apr. 3, 2020

(86) PCT No.: PCT/EP2020/059620
§ 371 (c)(1),
(2) Date: Jun. 13, 2022

(87) PCT Pub. No.: WO2021/151520
PCT Pub. Date: Aug. 5, 2021

(65) Prior Publication Data
US 2022/0417121 A1    Dec. 29, 2022

(30) Foreign Application Priority Data
Jan. 27, 2020    (EP) ..................... 20382046

(51) Int. Cl.
*G06Q 20/38*    (2012.01)
*G06F 8/65*    (2018.01)
(Continued)

(52) U.S. Cl.
CPC ............. *G06Q 20/382* (2013.01); *G06F 8/65* (2013.01); *H04L 41/142* (2013.01);
(Continued)

(58) Field of Classification Search
CPC .. G06Q 20/382; G06Q 20/4016; H04L 41/14; H04L 41/147; H04L 47/2483;
(Continued)

(56) References Cited

U.S. PATENT DOCUMENTS 11,403,087 B2 *  8/2022  Lin .......................... G06F 8/65
2019/0230038 A1 *  7/2019  Hughes ................. H04L 41/147
(Continued)

FOREIGN PATENT DOCUMENTS

WO    2019210947 A1    11/2019
WO    2019234481 A1    12/2019

OTHER PUBLICATIONS

"3GPP TS 23.288 V16.0.0", 3rd Generation Partnership Project; Technical Specification Group Services and System Aspects; Architecture enhancements for 5G System (5GS) to support network data analytics services (Release 16), Jun. 2019, pp. 1-52.
(Continued)

*Primary Examiner* — Kyung H Shin
(74) *Attorney, Agent, or Firm* — Murphy, Bilak & Homiller, PLLC (57) ABSTRACT

A method of classifying traffic data in a network comprises at a Network Data Analytics Function (NWDAF), receiving information relating to traffic data with a known classification from one or more first network functions, and developing a model for classifying future traffic data based on the information relating to the traffic data with a known classification. The method also involves at a second network function, storing a representation of the developed model. The method also involves at a third network function, receiving the representation of the developed model from the second network function, and installing the representation of the developed model at a fourth network function.

(Continued)

The method also involves at the fourth network function, classifying traffic data using the developed model.

18 Claims, 6 Drawing Sheets

(51) Int. Cl.
*H04L 41/142* (2022.01)
*H04L 41/147* (2022.01)
*H04L 41/16* (2022.01)
*H04L 43/062* (2022.01)
*H04L 67/00* (2022.01)

(52) U.S. Cl.
CPC ............ *H04L 41/147* (2013.01); *H04L 41/16* (2013.01); *H04L 43/062* (2013.01); *H04L 67/34* (2013.01)

(58) Field of Classification Search
CPC ..... H04L 41/40; H04L 43/20; H04L 47/2441; H04L 43/026; H04L 43/16; H04L 45/72; H04L 45/74; H04L 41/16; H04L 67/34; H04L 67/125; H04L 67/12; H04W 24/08; H04W 4/00; H04W 4/50; H04W 4/06; G06N 20/00; G06F 8/65; H04N 21/44008; H04N 21/2187; H04N 21/8458
See application file for complete search history.

(56) References Cited

U.S. PATENT DOCUMENTS

2020/0252813 A1\* 8/2020 Li .................... G06Q 20/382
2022/0124469 A1\* 4/2022 Liao .................... H04L 67/34

OTHER PUBLICATIONS

"3GPP TS 23.503 V16.3.0", 3rd Generation Partnership Project; Technical Specification Group Services and System Aspects; Policy and charging control framework for the 5G System (5GS); Stage 2 (Release 16), Dec. 2019, pp. 1-112.
"A new key issue for application detection", SA WG2 Meeting #136AH, S2-2001303, Incheon, South Korea, was S2-2001239, 0801, Jan. 13-17, 2020, pp. 1-2.
"3GPP TS 29.522 V16.1.0", 3rd Generation Partnership Project; Technical Specification Group Core Network and Terminals; 5G System; Network Exposure Function Northbound APIs; Stage 3 (Release 16), Sep. 2019, pp. 1-82.
"3GPP TS 23.501 V16.3.0", 3rd Generation Partnership Project; Technical Specification Group Services and System Aspects; System architecture for the 5G System (5GS); Stage 2 (Release 16), Dec. 2019, pp. 1-417.
"3GPP TS 23.501 V15.3.0", 3rd Generation Partnership Project; Technical Specification Group Services and System Aspects; System Architecture for the 5G System; Stage 2 (Release 15), Sep. 2018, pp. 1-226.

\* cited by examiner

CLASSIFYING TRAFFIC DATA

FIELD OF THE INVENTION

Embodiments described herein relate to methods and apparatus for classifying traffic data in a network.

BACKGROUND

3GPP TS 29.522 defines an exposure framework which allows a content provider to interact with an operator's network. The exposure framework includes a Nnef_PFD Management service that allows the content provider to provide deterministic rules to the network operator, which allow the network operator to differentiate and classify the content provider's traffic appropriately for a certain set of applications. This information may be contained in the standardized Packet Flow Description (PFD). This is a set of information enabling the detection of application traffic.

However, many content providers (for example, small Over The Top (OTT) content providers) do not support the 3GPP exposure framework, and are not able to use the Nnef_PFD Management service to provide PFD rules for application of interest to the content provider. In these circumstances, the content providers have to rely on vendor capabilities to detect and classify traffic.

Similarly, some network operators (for example, small operators) also do not support the 3GPP exposure framework. Again, in these circumstances, the network operators also have to rely on vendor capabilities to detect and classify traffic.

Vendor capabilities to detect and classify traffic are typically based on a Deep Packet Inspection (DPI) engine in the User Plane Function (UPF) with local Operation and Maintenance (OAM) configuration of the classification rules. However, the classification that is performed via this method may not be accurate, as the classification rules are required to be updated frequently. For example, when an application (for example, Netflix) deploys a new content server, the corresponding IP address will need to be added to the local configuration.

For content providers and network operators that support the 3GPP exposure framework, and specifically the Nnef_PFD Management service, for a given application, the content provider is able to provide deterministic rules which allow the network operator to classify the traffic. However, in some circumstances, the provision of these deterministic rules may not be sufficient to allow the traffic to be classified. For example, when the traffic is encrypted, URLs are not valid in the case of HTTPs or QUIC traffic. Furthermore, FQDNs/Domains are not valid when DNS is encrypted (for example, DoH), and IP addresses are not valid when IPSec is used, or when a certain CDN node hosts several applications.

Therefore, it may be advantageous to provide a method that enables a network operator and/or a content provider to classify traffic accurately.

SUMMARY

According to a first aspect, there is provided a method of classifying traffic data in a network. The method comprises at a Network Data Analytics Function (NWDAF), receiving information relating to traffic data with a known classification from one or more first network functions, and developing a model for classifying future traffic data based on the information relating to the traffic data with a known classification. The method also comprises at a second network function, storing a representation of the developed model. The method also comprises at a third network function, receiving the representation of the developed model from the second network function, and installing the representation of the developed model at a fourth network function. The method also comprises at the fourth network function, classifying traffic data using the developed model.

The method may further comprise at the NWDAF, receiving a request from a fifth network function for a model for classifying future traffic data.

The request for a model for classifying future traffic data may further comprise information identifying an application for which future traffic data is to be classified.

The request for a model for classifying future traffic data may further comprise an accuracy indicator, wherein the accuracy indicator represents a minimum likelihood for the developed model to correctly classify future traffic data for the application.

The one or more first network functions may comprise at least one of: a network function for storing subscription data (UDR), a network function for user data traffic handling (UPF), or a network function for network exposure (NEF).

The information relating to traffic data with a known classification may comprise at least one preexisting rule describing the traffic data with a known classification.

The information relating to traffic data with a known classification may comprise raw traffic data with a known classification.

The method may further comprise at the NWDAF, determining an accuracy measure for the developed model, wherein the accuracy measure indicates the likelihood for the developed model to correctly classify future traffic data.

The accuracy measure may indicate the likelihood for the developed model to correctly classify future traffic data for a particular application.

The representation of the developed model may further comprise the determined accuracy measure for the developed model.

The representation of the developed model may further comprise information relating to an application for which future traffic data is to be classified by the model.

The representation of the developed model may further comprise metadata relating to the developed model.

The method may further comprises at the NWDAF, notifying the fifth network function that the model has been developed.

The step of developing the model for classifying future traffic data based on the information relating to the traffic data with a known classification may comprise developing the model using a machine-learning technique.

According to another aspect, there is provided a system for classifying traffic data in a network. The system comprises a Network Data Analytics Function, a second network function, a third network function, and a fourth network function. The system is configured to perform a method according to the first aspect.

According to a further aspect, there is provided computer program product, comprising computer readable code, configured for causing a suitable programmed processor to perform a method according to the first aspect.

According to a still further aspect, there is provided computer program product, comprising a tangible computer readable medium, containing computer readable instructions for causing a processor to perform a method. The method comprises at a Network Data Analytics Function (NWDAF), receiving information relating to traffic data with a known classification from one or more first network functions, and developing a model for classifying future traffic data based on the information relating to the traffic data with a known classification. The method also comprises at a second network function, storing a representation of the developed model. The method also comprises at a third network function, receiving the representation of the developed model from the second network function, and installing the representation of the developed model at a fourth network function. The method also comprises at the fourth network function, classifying traffic data using the developed model.

DETAILED DESCRIPTION

The description below sets forth example embodiments according to this disclosure. Further example embodiments and implementations will be apparent to those having ordinary skill in the art. Further, those having ordinary skill in the art will recognize that various equivalent techniques may be applied in lieu of, or in conjunction with, the embodiments discussed below, and all such equivalents should be deemed as being encompassed by the present disclosure.

The following sets forth specific details, such as particular embodiments for purposes of explanation and not limitation. But it will be appreciated by one skilled in the art that other embodiments may be employed apart from these specific details. In some instances, detailed descriptions of well-known methods, nodes, interfaces, circuits, and devices are omitted so as not obscure the description with unnecessary detail. Those skilled in the art will appreciate that the functions described may be implemented in one or more nodes using hardware circuitry (e.g., analog and/or discrete logic gates interconnected to perform a specialized function, ASICs, PLAs, etc.) and/or using software programs and data in conjunction with one or more digital microprocessors or general purpose computers that are specially adapted to carry out the processing disclosed herein, based on the execution of such programs. Nodes that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Hardware implementation may include or encompass, without limitation, digital signal processor (DSP) hardware, a reduced instruction set processor, hardware (e.g., digital or analog) circuitry including but not limited to application specific integrated circuit(s) (ASIC) and/or field programmable gate array(s) (FPGA(s)), and (where appropriate) state machines capable of performing such functions.

Figure 1:
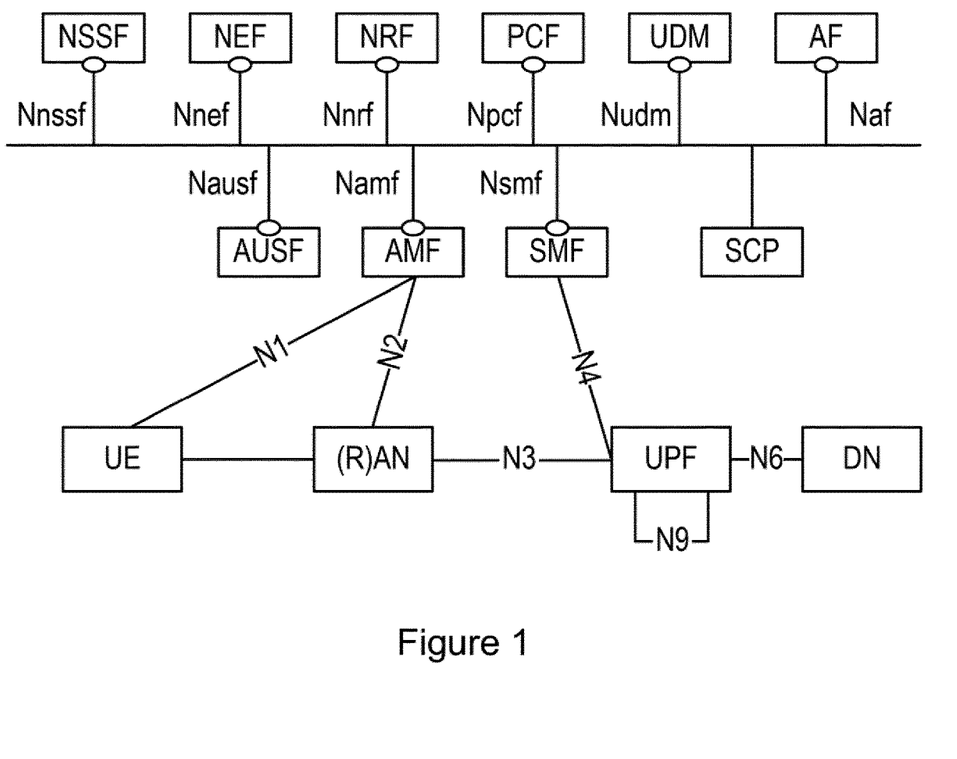
FIG. 1 is a block schematic diagram of a network architecture.

FIG. 1 illustrates a 5G mobile communications network architecture, as defined in the 3GPP TS 23.501 v 15.3.0.

This architecture has service-based interfaces in the control plane, implying that the interaction of the network functions is done by means of services. The network functions in the 5G control plane provide services that are consumed by other network functions in the 5G control plane.

The most relevant functional elements for the purposes of understanding this disclosure are the following:

The AF (Application Function) may interact with the 3GPP Core Network to exchange information with the network operator.

The NEF (Network Exposure Function) translates between information exchanged with the external Application Function (AF) and information exchanged with the internal network function(s). It is the Operator Network entry point for Application Service Providers (ASPs), such that an external AF interacts with the 3GPP Core Network through the NEF. This is a unique way of creating an interactive relationship between the service providers and network operators.

The PCF (Policy Control Function) supports a unified policy framework to govern the behaviour of the network, and may provide PCC (Policy and Charging Control) rules to the SMF (Session Management Function). It also implements a Front End (PCF FE) to access subscription information relevant for policy decisions in a Unified Data Repository (UDR). The PCF provides PCC rules to the Policy and Charging Enforcement Function (PCEF) that enforces policy and charging decisions according to the PCC rules.

The SMF (Session Management Function) is responsible for Session establishment, modification and release, including selection and control of the UPF entities (for example, for event reporting). SMF can provide to UPF information related to classification information obtained e.g. from the NEF, for the service classification of the user IP data. SMF interacts with the UPF over N4 Reference point using PFCP procedures.

The UPF (User Plane Function) handles the user data traffic (for example, based on rules received from the SMF) and optionally includes Deep Packet Inspection (DPI) functionality, which comprises inspecting and analysing the contents of the IP data packets beyond the so-called IP 5 tuples. The IP 5 tuples consist of the heading elements of an IP data packet comprising: IP source address, IP destination address, source transport address, destination transport address, and protocol over IP (e.g. TCP, UDP). The SMF may also support different enforcement actions, for example, event detection and reporting.

The UDR (Unified Data Repository), not shown in FIG. 1, provides storage and retrieval of subscription data by the UDM (Unified Data Management, which is the evolution of HSS in the 5G architecture), storage and retrieval of policy data by the PCF and storage and retrieval of structured data for exposure, and application data (including Packet Flow Descriptions (PFDs) for application detection, application request information for multiple UEs), by the NEF.

The NWDAF (Network Data Analytics Function), not shown in FIG. 1, is also part of the architecture specified in TS 23.501, and uses the mechanisms and interfaces specified for 5GC and OAM.

The NWDAF may interact with different entities for different purposes. For example, the NWDAF may collect data based on event subscription, which may be provided by the AMF (Access and Mobility Management Function), the SMF, the PCF, the UDM (Unified Data Management), the AF (directly or via the NEF), and the OAM. The NWDAF may also retrieve information from data repositories (for example, from the UDR (Unified Data Repository) via the UDM for subscriber-related information. The NWDAF may also retrieve information about NFs (for example, from the NRF (Network Repository Meeting) for NF-related information, from the NSSF (Network Slice Selection Function) for slice-related information). The NWDAF may also provide analytics to consumers on demand.

As noted above, many content providers and network operators do not support the 3GPP exposure framework which allow content providers to provide the deterministic rules to the network operator that allow the network operator to differentiate and classify the content provider's traffic appropriately for a certain set of applications. Furthermore, in examples where the 3GPP exposure framework is supported, the provision of the deterministic rules to the network operator may not be sufficient to allow the network operator to classify the traffic.

Methods are described herein, in which a model for classifying future traffic data based on the information relating to the traffic data with a known classification may be developed at the NWDAF. A representation of the developed model may then be stored at a second network function. A third network function may then receive the representation of the developed model from the second network function, and install the representation of the developed model at a fourth network function. The fourth network function may then classify traffic data using the developed model. Thus, methods described herein allow a network operator and/or a content provider to classify traffic accurately.

The further description herein relates to embodiments in which the method is performed in a 5G network architecture as shown in FIG. 1.

Figure 2A:
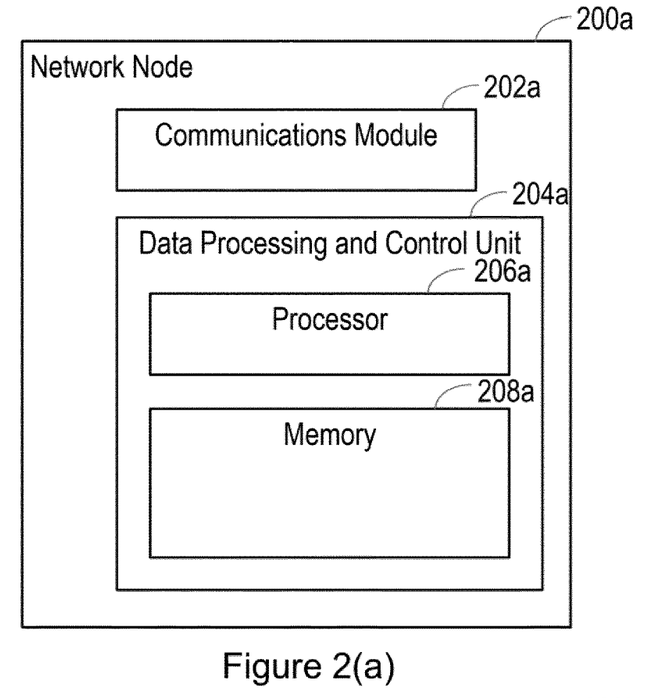
FIGS. 2(a), 2(b), 2(c) and 2(d) are block schematic diagrams of network nodes.

FIG. 2(a) is a block schematic diagram of a network node 200a, more specifically a network node for a Network Data Analytics Function (NWDAF).

The network node 200a comprises a communications module 202a and a data processing and control unit 204a.

The communications module 202a is configured for communication using any required communications protocol, for example with other nodes of the architecture shown in FIG. 1.

The data processing and control unit 204a comprises a processor 206a and a memory 208a. The memory 208a is configured for storing working data as required, and also for storing program instructions, and the processor 206a is configured for performing data processing and logical operations on the basis of program instructions stored in the memory 208a. More specifically, the processor 206a may be programmed to perform the methods described herein. Although shown as respective single units, the processor 206a and the memory 208a may be implemented as multiple units, each carrying out a respective part of the required functionality.

Figure 2B:
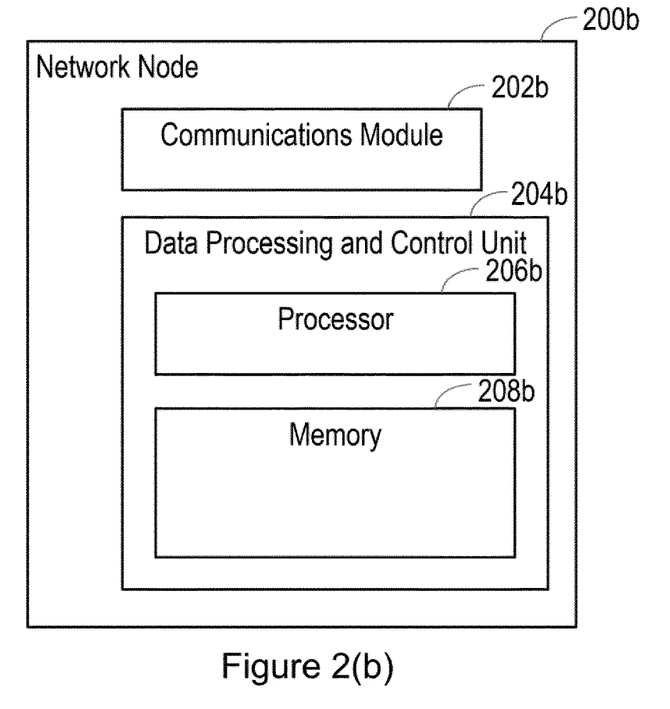

FIG. 2(b) is a block schematic diagram of a network node 200b, more specifically a network node for a Network Function (NF), for example a UDR network node in the architecture of FIG. 1.

The network node 200b comprises a communications module 202b and a data processing and control unit 204b.

The communications module 202b is configured for communication using any required communications protocol, for example with other nodes of the architecture shown in FIG. 1.

The data processing and control unit 204b comprises a processor 206b and a memory 208b. The memory 208b is configured for storing working data as required, and also for storing program instructions, and the processor 206b is configured for performing data processing and logical operations on the basis of program instructions stored in the memory 208b. More specifically, the processor 206b may be programmed to perform the methods described herein. Although shown as respective single units, the processor 206b and the memory 208b may be implemented as multiple units, each carrying out a respective part of the required functionality.

Figure 2C:
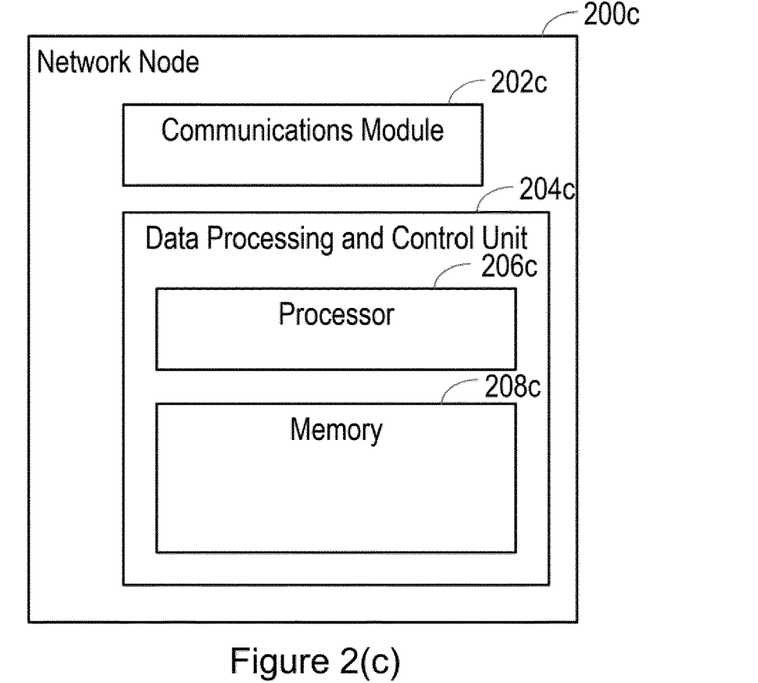

FIG. 2(c) is a block schematic diagram of a network node 200c, more specifically a network node for a Network Function (NF), for example a SMF network node in the architecture of FIG. 1.

The network node 200c comprises a communications module 202c and a data processing and control unit 204c.

The communications module 202c is configured for communication using any required communications protocol, for example with other nodes of the architecture shown in FIG. 1.

Figure 2D:
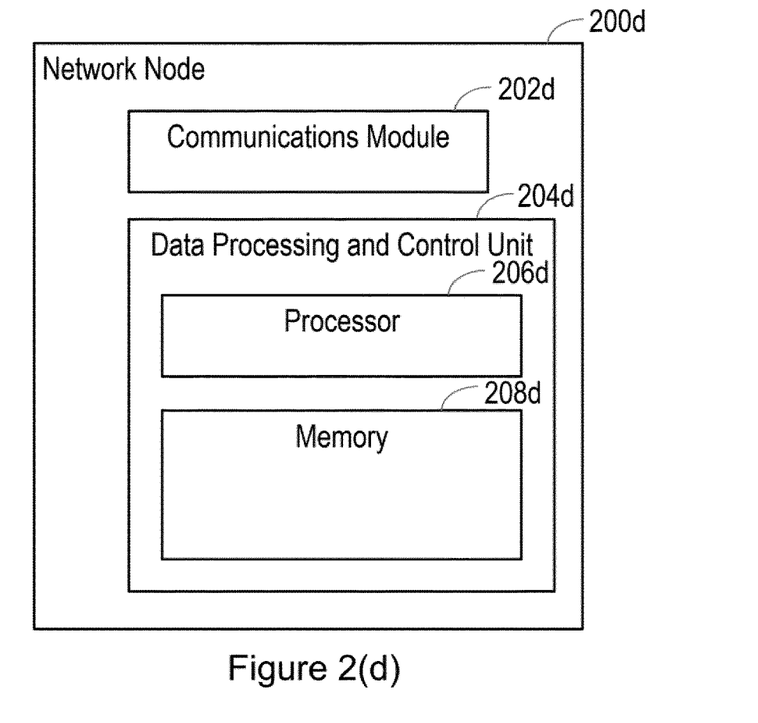

The data processing and control unit 204c comprises a processor 206c and a memory 208c. The memory 208c is configured for storing working data as required, and also for storing program instructions, and the processor 206c is configured for performing data processing and logical operations on the basis of program instructions stored in the memory 208c. More specifically, the processor 206c may be programmed to perform the methods described herein. Although shown as respective single units, the processor 206c and the memory 208c may be implemented as multiple units, each carrying out a respective part of the required functionality FIG. 2(d) is a block schematic diagram of a network node 200d, more specifically a network node for a Network Function (NE), for example a UPF network node in the architecture of FIG. 1.

The network node 200d comprises a communications module 202d and a data processing and control unit 204d.

The communications module 202d is configured for communication using any required communications protocol, for example with other nodes of the architecture shown in FIG. 1.

The data processing and control unit 204d comprises a processor 206d and a memory 208d. The memory 208d is configured for storing working data as required, and also for storing program instructions, and the processor 206d is configured for performing data processing and logical operations on the basis of program instructions stored in the memory 208d. More specifically, the processor 206d may be programmed to perform the methods described herein. Although shown as respective single units, the processor 206d and the memory 208d may be implemented as multiple units, each carrying out a respective part of the required functionality.

Figure 3:
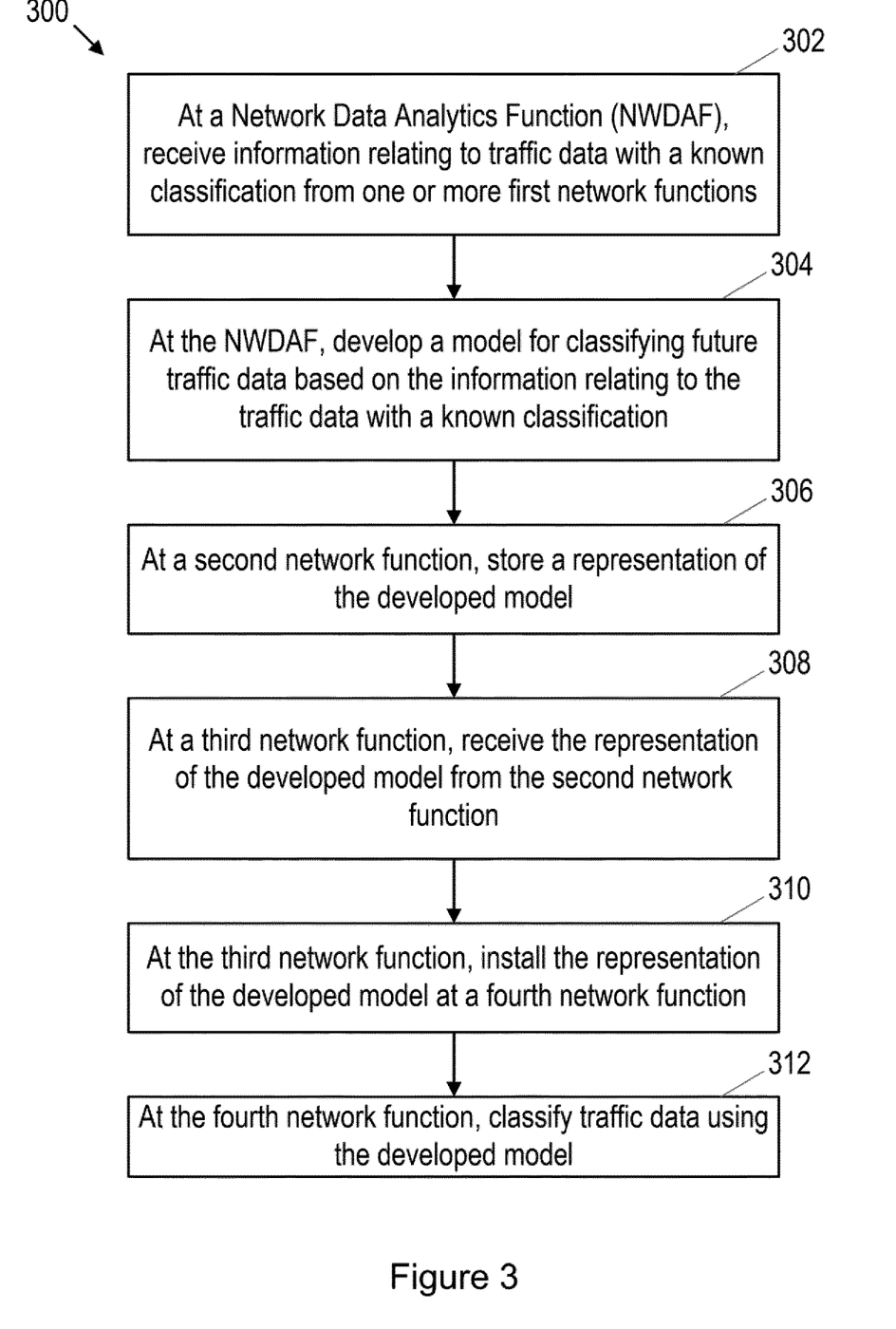
FIG. 3 is a flow chart illustrating a method of classifying traffic data in a network.

FIG. 3 is a flow chart, illustrating a method 300 of classifying traffic data in a network. The method 300 may be executed by a plurality of network nodes in the architecture of FIG. 1, for example, the network nodes 200a, 200b, 200c and 200d.

The method 300 comprises, at step 302, at a Network Data Analytics Function (NWDAF), receiving information relating to traffic data with a known classification from one or more first network functions.

In some embodiments, the one or more first network functions may comprise at least one of: a network function for storing subscription data (UDR), a network function for user data traffic handling (UPF), or a network function for network exposure (NEF).

In some embodiments, the information relating to traffic data with a known classification may comprise at least one preexisting rule describing the traffic data with a known classification. Additionally or alternatively, the information relating to traffic data with a known classification may further comprise raw traffic data with a known classification.

For example, the information relating to traffic data with a known classification may comprise one or more PFD rules for one or more applications of interest. At least one of the one or more PFD rules may be received from the NEF. In this example, the one or more PFD rules may be received from the NEF following the receipt of a Nnef_PFDManagement request at the NEF.

In another example, at least one of the one or more PFD rules may be received from the UDR. In this example, the NWDAF may be permitted to access the existing PFD rules for the one or more application of interest that are stored in the UDR. The PFD rules may be stored in the UDR as part of the "Application Data" for each of the applications of interest.

It will be appreciated that the term "application of interest" shall be used to refer to an application for which future traffic data is to be classified throughout this specification.

In another example, the NWDAF may receive traffic data from the UPF. In some embodiments, the NWDAF may request the UPF to mirror traffic data that has been, or can be, tagged with the application of interest (in the circumstances in which the UPF applies DPI techniques to the traffic data). Additionally or alternatively, the NWDAF may request from the UPF specific metrics relating to the traffic data via standard mechanisms. It will be appreciated that those skilled in the art will be aware of a number of mechanisms by which the data collection may be configured from the UPF.

In some embodiments, the NWDAF may be co-located with the UPF, in order to provide the NWDAF with direct access to the necessary traffic data.

In some embodiments, the method may further comprise, at the NWDAF, receiving a request from a fifth network function for a model for classifying future traffic data.

For example, the development of a model for classifying future traffic data may be triggered by the receipt of a request for a model at the NWDAF, from a consumer. In some embodiments, the request may comprise a subscription request sent by the consumer for a new analytics event for one or more applications of interest.

In some embodiments, the fifth network function may comprise an SMF, which when a PDU session is established, receives PCC rules for certain applications of interest when the classification rules are not available in the NEF or the UDR. In other words, the fifth network function may be a potential consumer of the developed model.

Alternatively, the fifth network function may comprise an OAM function. For example, the development of a model for classifying future traffic data may be triggered by the receipt of a request to activate NWDAF logic for new analytics events at the NWDAF, from OAM, for certain applications of interest.

In some embodiments, the request for a model for classifying future traffic data may further comprise information identifying an application for which future traffic data is to be classified.

For example, the information identifying the application may comprise an application identifier, AppId (for example AppId=Netflix), for the relevant application.

In some embodiments, the request for a model for classifying future traffic data may further comprise an accuracy indicator, wherein the accuracy indicator represents a minimum likelihood for the developed model to correctly classify future traffic data for the application.

It will be appreciated that, as the models that are developed by the NWDAF are not deterministic, an accuracy measure may be required in order to interpret the level of uncertainty of the developed model. For example, if the developed model were to have an accuracy of 0.9, then a packet that has been classified as belonging to the application by the developed model will have a 90% chance of belonging to the application. The accuracy indicator may therefore represent a minimum accuracy that the developed model should be able to achieve.

At step 304, at the NWDAF, a model for classifying future traffic data is developed based on the information relating to the traffic data with a known classification.

It will be appreciated that, the term "model" may also refer to a classification rule in the context of this specification.

In some embodiments, the method may further comprise the step of, at the NWDAF, determining an accuracy measure for the developed model, wherein the accuracy measure indicates the likelihood for the developed model to correctly classify future traffic data. In some embodiments, the accuracy measure may indicate the likelihood for the developed model to correctly classify future traffic data for a particular application.

In some embodiments, the step of developing the model for classifying future traffic data based on the information relating to the traffic data with a known classification may comprise developing the model using a machine-learning technique. It will be appreciated that those skilled in the art will be aware of a number of mechanisms by which a model may be developed using a machine-learning technique.

For example, the model for classifying future traffic data for a particular application may be developed using a machine-learning technique and using the received PFD rules retrieved from the NEF and/or the UDR, and/or the traffic data collected from the UPF. In other words, the information relating to the traffic data may be considered an input to the machine-learning technique that is executed at the NWDAF.

It will be appreciated that a model may be developed for classifying future traffic data for one or more applications of interest. It will also be appreciated that one or more models for classifying future traffic data for one or more applications of interest may be developed by the NWDAF.

At step 306, at a second network function, a representation of the developed model is stored.

In some embodiments, the second network function may comprise the UDR.

For example, the NWDAF may store a representation of the developed model at the UDR. In some embodiments, the NWDAF may be able to access the relevant "Application Data" for the application of interest at the UDR. In this example, the NWDAF may store a representation of the developed model as part of the relevant "Application Data" for the application of interest.

The "Application Data" stored at the UDR for each application of interest may also be configured to store an indication whether a model (or deterministic rule) that has been stored as part of the "Application Data" has been received from an external application function, or from the NWDAF.

It will be appreciated that, where an accuracy measure for the developed model has been determined, the accuracy measure may also be stored by the NWDAF.

In some embodiments, the representation of the developed model may further comprise the determined accuracy measure for the developed model. Additionally or alternatively, the representation of the developed model may further comprise information relating to an application for which future traffic data is to be classified by the model. For example, the representation of the developed model may comprise the developed model itself. Alternatively, the representation of the developed model may comprise a number of parameters and/or values that represent the model, and/or the type of model. For example, the representation of the developed model may comprise the parameterization of the weights of a neural network (in the circumstance where the developed model comprises a neural network).

In some embodiments, the representation of the developed model may further comprise metadata relating to the developed model. For example, the representation of the developed model may comprise one or more of a set of parameters to be taken as an input of the developed model, the number of layers of comprised within the neural network (in the circumstances in which the developed model comprises a neural network), the number of neurons per layer within the neural network (in the circumstances in which the developed model comprises a neural network). In some embodiments, the metadata relating to the developed model may be provided in place of, or in addition to, the developed model.

At step 308, at a third network function, the representation of the developed model is received from the second network function.

In some embodiments, the third network function may comprise the SMF.

For example, the representation of the developed model may be provisioned to a PDU session that has been established by the SMF.

It will be appreciated that, where a network function has subscribed to PFD changes at the UDR for an application of interest, that network function will receive a notification from the UDR comprising the updated PFD, where the updated PFD comprises representation of the one or more developed models that have been received from the NWDAF.

At step 310, the third network function takes steps such that the representation of the developed model is installed at a fourth network function.

It will be appreciated that steps 308 and 310 may be executed when a PDU session is established by the SMF.

At step 312, at the fourth network function, traffic data is classified using the developed model.

In some embodiments, the fourth network function comprises the UPF.

In some embodiments, the method may further comprise the step of, at the NWDAF, notifying the fifth network function that the model has been developed. For example, the NWDAF may notify the subscribed consumers on the new analytics events for the one or more application of interest.

Thus, methods described herein allow a network operator and/or a content provider to classify traffic accurately.

Figure 4:
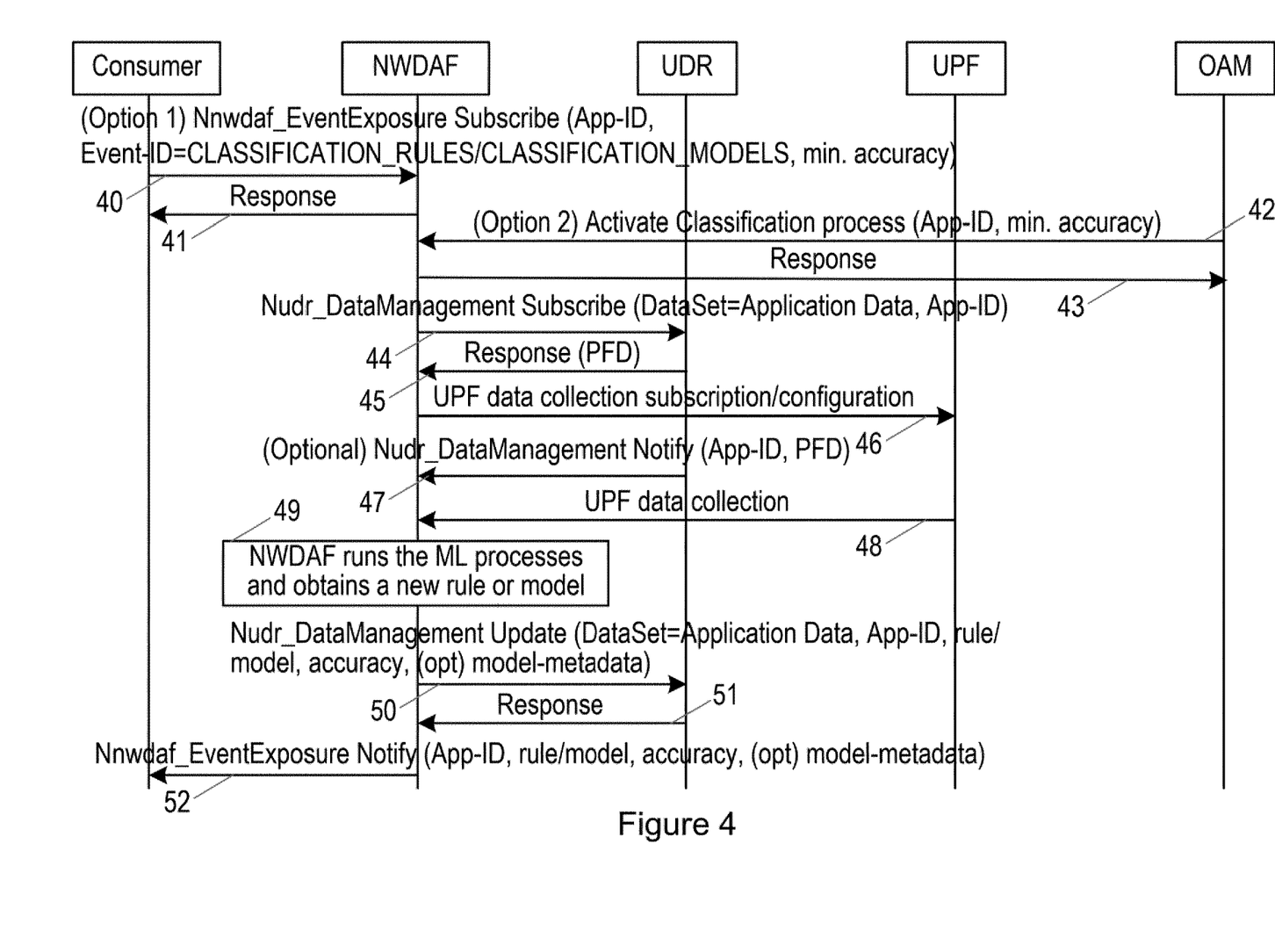
FIG. 4 is a signalling diagram.
Figure 5:
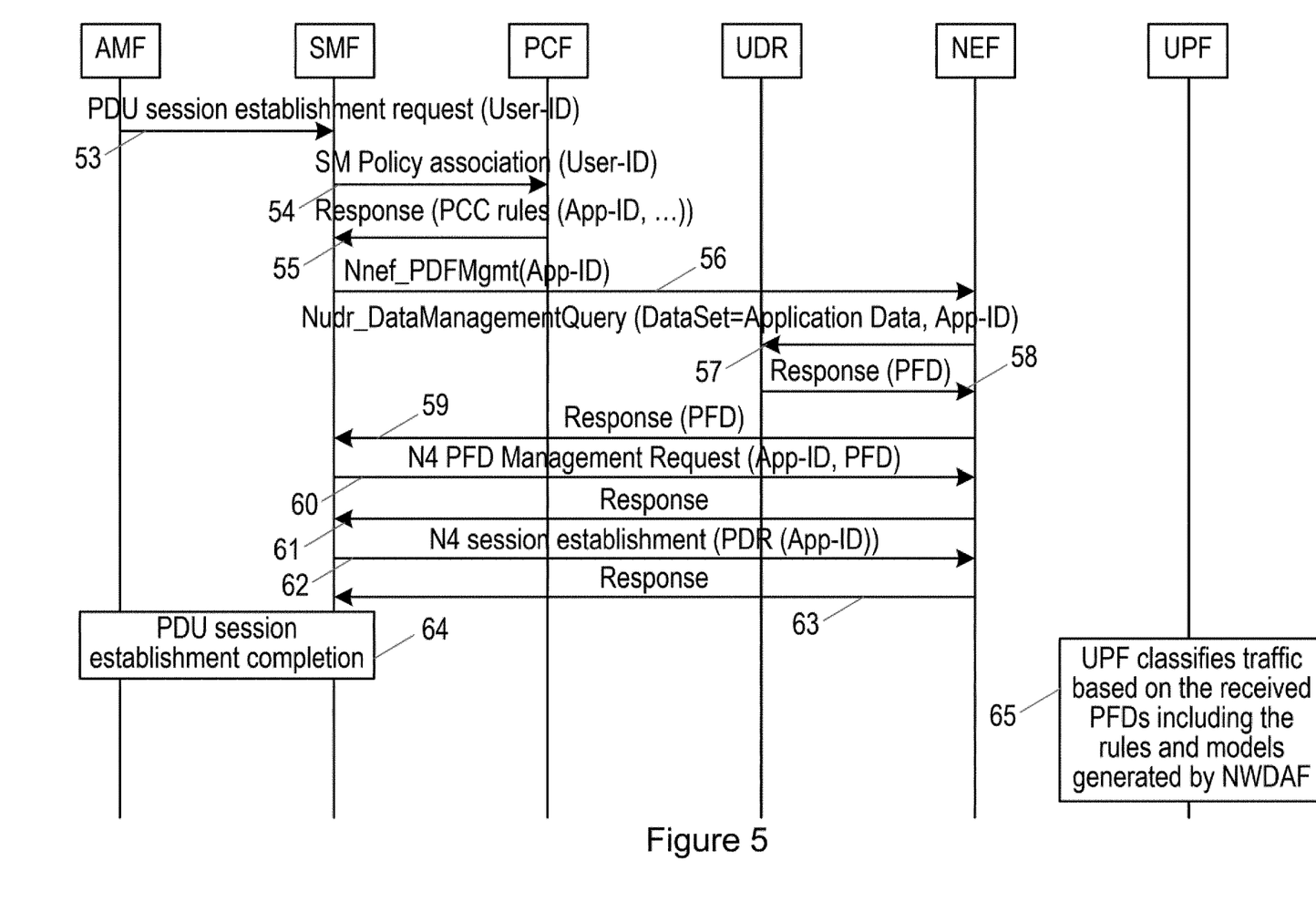
FIG. 5 is a signalling diagram.

FIGS. 4 and 5 are signalling diagrams, illustrating example messages sent in one embodiment. As described above, this uses the NWDAF in order to develop a model to classify future traffic data for one or more application of interest, and storing the developed model along with an indication of the corresponding application of interest at the UDR, as illustrated in FIG. 4. Following this, as illustrated in FIG. 5, upon PDU session establishment, the SMF retrieves the developed model from the UDR, and installs the model in the NF performing the traffic classification, namely the UPF.

The sequence of messages shown in FIG. 4 assume that the NWDAF has registered in the NRF such that the NWDAF supports a parameter that indicates that a model for classifying future traffic data is sought (for example, "Event-ID=CLASSIFICATION_RULES/CLASSIFICATION_MODELS").

A request for a model for classifying future traffic data may be received in one of two ways.

The first option is that, at step 40, a consumer that is interested in receiving a model for future traffic classification subscribes to the NWDAF. In other words, the NWDAF receives a request for a model for classifying future traffic data from a fifth network function.

In this illustrated example, the consumer invokes the Nnwdaf_EventExposure Subscribe service operation, where the request comprises information identifying an application for which future traffic data is to be classified (App-ID), and a parameter that indicates that a model for classifying future traffic data is sought (Event-ID=CLASSIFICATION_RULES/ CLASSIFICATION_MODELS). In this illustrated example, the request further comprises an accuracy indicator (min. accuracy), wherein the accuracy indicator represents a minimum likelihood for the developed model to correctly classify future traffic data for the application.

At step 41, the NWDAF responds to the request sent in step 40. This response may comprise an acknowledgement message.

Alternatively, the second option is that the process may be initiated by the sending at step 42 of a message from the OAM, requesting the activation of the relevant analytics processes at the NWDAF that may be required to generate a model for an application of interest. In other words, the NWDAF receives a request for a model for classifying future traffic data from a fifth network function.

In this illustrated example, the request comprises information identifying an application for which future traffic data is to be classified (App-ID), and further comprises an accuracy indicator (min. accuracy), wherein the accuracy indicator represents a minimum likelihood for the developed model to correctly classify future traffic data for the application.

At step 43, the NWDAF responds to the request sent in step 42. This response may comprise an acknowledgement message.

Following the receipt of a request for a model for classifying future traffic data (either from the consumer, or from the OAM), the NWDAF activates the required data collection mechanisms to allow an appropriate model to be developed.

At step 44, the NWDAF subscribes to the data that is stored at the UDR that corresponds to the application of interest. In this example, the NWDAF achieves this by invoking the Nudr_DataManagement Subscribe service. In other words, the NWDAF requests information relating to traffic data with a known classification from one or more first network functions.

In this example, the request for information relating to the traffic data comprises the information identifying an application for which future traffic data is to be classified (App-ID). In this example, the request further comprises information identifying the data that is stored at the UDR that corresponds to the application of interest (DataSet=Application Data). In some examples, the information identifying the data corresponding to the application may comprise Packet Flow Descriptors (PFD) that correspond to the application of interest.

At step 45, the UDR responds to the request sent in step 44. In this illustrated example, the response comprises the existing PFD for the application of interest.

The PFD comprise deterministic packet filters, which deterministically identify the application of interest using certain matching conditions, such as a destination IP address. The PFD further comprises a placeholder for heuristic rules or non-deterministic models. Thus, the NWDAF receives information relating to traffic data with a known classification from a first network function.

At step 46, the NWDAF configures data collection from the UPF. It will be appreciated that those skilled in the art will be aware of a number of mechanisms by which the data collection may be configured from the UPF, such as a mechanism based on existing standard specifications, for example. Thus, the NWDAF receives information relating to traffic data with a known classification from a first network function.

If there is a PFD update in the UDR for the application of interest, at step 47, the UDR sends the new PFD to the NWDAF. In this illustrated example, the UDR sends the new PFD to the NWDAF by invoking the Nudr_DataManagement Notify service operation.

In this illustrated example, the message that is communicated to the NWDAF comprises the new PDF, and further comprises information identifying an application for which future traffic data is to be classified (App-ID). Thus, the NWDAF will develop a model for classifying future traffic data that is based on up to date information relating to the traffic data with a known classification.

At step 48, the UPF sends the relevant data to the NWDAF. In other words, the NWDAF receives information relating to traffic data with a known classification from a first network function. It will be appreciated that those skilled in the art will be aware of a number of mechanisms by which UPF may send relevant data to the NWDAF, such as a mechanism based on existing standard specifications, for example.

At step 49, the NWDAF develops a model for classifying future traffic data based on the information relating to the traffic data with a known classification. In this illustrated example, the model for classifying future traffic data is developed using a machine-learning technique. It will be appreciated that those skilled in the art will be aware of a number of mechanisms by which a model may be developed using a machine-learning technique.

For example, the NWDAF may develop a model based on information that a certain pattern in the traffic is identical for both a known classification (for example, an IP address that has been included in a PFD for an application of interest), and an unknown classification. In this example, the NWDAF may determine that the traffic of the unknown classification also corresponds to the application of interest.

Additionally or alternatively, the NWDAF may develop a model based on information that a certain pattern in the traffic corresponds to a certain application of interest. For example, the NWDAF may determine that the traffic data for a particular application of interest has a constant packet interarrival time, and that this packet interarrival time is not observed for any other application. In this example, the NWDAF may determine that the particular packet interarrival time is associated with the application of interest, and may then develop a model that is able to classify the traffic data as belonging to the application of interest in response to receiving traffic data with that particular packet interarrival time.

In some embodiments, the NWDAF may also determine an accuracy measure for the developed model, wherein the accuracy measure indicates the likelihood for the developed model to correctly classify future traffic data. The accuracy measure may indicate the likelihood for the developed model to correctly classify future traffic data for a particular application.

In some embodiments, wherein the received request for a model for classifying future traffic data comprised a minimum accuracy indicator, the NWDAF may continue to develop the model for classifying future traffic data based on the information relating to the traffic data with a known classification, until the determined accuracy measure for the developed model is equal to or exceeds the minimum accuracy indicator specified in the request.

At step 50, the NWDAF updates the PFD in the UDR. In other words, a representation of the developed model is stored at a second network function. In this illustrated example, the NWDAF updates the PFD in the UDR by invoking the Nudr_DataManagement Update service. In this illustrated example, the Nudr_DataManagement Update service is invoked including the information identifying an application for which future traffic data is to be classified (App-ID), the developed model (rule/model), the information identifying the data corresponding to the application stored at the UDR (DataSet=Application Data), and the accuracy measure of the developed model (accuracy). In this example, the Nudr_DataManagement Update service operation further comprises metadata relating to the developed model (model-metadata). For example, the representation of the developed model may comprise one or more of a set of parameters to be taken as an input of the developed model, such as the number of layers comprised within the neural network (in the circumstances in which the developed model comprises a neural network), and/or the number of neurons per layer within the neural network (in the circumstances in which the developed model comprises a neural network). In some embodiments, the metadata relating to the developed model may be provided in place of, or in addition to, the developed model.

At step 50, the UDR acknowledges the PFD update received by the UDR at step 49. For example, the UDR may communicate an acknowledgement message to the NWDAF.

At step 61, the NWDAF notifies the subscribed consumer that the model for classifying future traffic data has been developed. In this illustrated example, the NWDAF notifies the subscribed consumers invoking the Nnwdaf_EventExposure Notify service operation. In this example, Nnwdaf_EventExposure Notify service operation is invoked including the information identifying an application for which future traffic data is to be classified (App-ID), the developed model (rule/model), and the accuracy measure of the developed model (accuracy). In this example, the Nnwdaf_EventExposure Notify service operation further comprises metadata relating to the developed model (model-metadata).

Referring now to FIG. 5, at step 53, the AMF sends a PDU session establishment request to the SMF. In this illustrated example, the request comprises the User-ID.

At step 54, the SMF requests an SM policy association at the PCF. In this illustrated example, the request comprises the User-ID.

At step 55, the PCF responds to the request. In this illustrated example, the response comprises the PCC rules corresponding to the application, for which future traffic data for that user, is to be classified.

At step 56, the SMF requests the necessary traffic filters to communicate to the UPF, from the NEF. In this illustrated example, the necessary traffic filters are requested by invoking the Nnef_PFD management service. In this example, the Nnef_PFD management service is invoked comprising the information identifying the application for which future traffic data is to be classified (App-ID).

At step 57, the NEF requests the PFD information from the UDR for the application for which future traffic data is to be classified. In this example, the request comprises the information identifying the application for which future traffic data is to be classified (App-ID), and further comprises information identifying the data that is stored at the UDR that corresponds to the application of interest (DataSet=Application Data).

At step 58, the UDR responds to the request received in step 57. In this illustrated example, the response comprises the PFD information for the application of interest, where the PFD information comprises a representation of the developed model. The PFD information for the application of interest may further comprise deterministic filters. Additionally or alternatively, the PFD may comprise a list of tuples. A tuple may comprise the representation of the developed model.

As described above, in some examples, the representation of the developed model may comprise the developed model itself. Alternatively, the representation of the developed model may comprise a number of parameters and/or values that represent the model, and/or the type of model. For example, the representation of the developed model may comprise the parameterization of the weights of a neural network (in the circumstance where the developed model comprises a neural network). In some embodiments, the representation of the developed model may further comprise metadata relating to the developed model. For example, the representation of the developed model may comprise one or more of a set of parameters to be taken as an input of the developed model, the number of layers of comprised within the neural network (in the circumstances in which the developed model comprises a neural network), and/or the number of neurons per layer within the neural network (in the circumstances in which the developed model comprises a neural network). In some embodiments, the metadata relating to the developed model may be provided in place of, or in addition to, the developed model. Additionally, the representation of the developed model may further comprise an accuracy measure for the developed model.

At step 59, the NEF responds to the SMF with the PDF information for the application of interest received in step 58. In other words, the representation of the developed model is received at a third network function, from a second network function.

At step 60, the SMF triggers an N4 PFD Management request towards the UPF In this illustrated example, the N4 PFD Management request comprises the PFD information for the application of interest, and further comprises information identifying an application for which future traffic data is to be classified (App-ID).

At step 61, the UPF acknowledges the N4 PFD Management request. The acknowledgement may comprise an acknowledgement message.

At step 62, the SMF establishes the N4 session for the user with the UPF. In this illustrated example, the establishment message comprises PFD information for the application of interest, and further comprises information identifying an application for which future traffic data is to be classified (App-ID). In other words, the representation of the developed model is installed at a fourth network function.

At step 63, the UPF acknowledges the N4 session establishment. The acknowledgement may comprise an acknowledgement message.

As indicated at step 64, following step 63, the PDU session establishment process is complete. The UPF is now able to execute received models in order to classify traffic data appropriately for applications of interest, as illustrated at step 65. It will be appreciated that the provided models may comprise both deterministic rules, and models that have been developed by the NWDAF. In other words, traffic data is classified using the developed model at a fourth network function.

As a result of this, the UPF may then execute relevant policies on the classified traffic data on a per application basis. For example, the UPF may execute a Quality of Service policy on the classified traffic data, wherein the Quality of Service policy is configured on a per application basis.

It will be appreciated that the UPF may receive more than one developed model. In these circumstances, the UPF may determine which of the plurality of developed models to use based on an accuracy measures that corresponds to each of the developed models, wherein each accuracy measure indicates the likelihood for the developed model to correctly classify future traffic data for a particular application.

There are thus described methods and apparatus that allow a network operator and/or a content provider to classify traffic accurately.

It should be noted that the above-mentioned embodiments illustrate rather than limit the invention, and that those skilled in the art will be able to design many alternative embodiments without departing from the scope of the appended claims. The word "comprising" does not exclude the presence of elements or steps other than those listed in a claim, "a" or "an" does not exclude a plurality, and a single feature or other unit may fulfil the functions of several units recited in the claims. Any reference signs in the claims shall not be construed so as to limit their scope.

The invention claimed is:

1. A computer-implemented method of classifying traffic data in a communications network, the method comprising:
   at a Network Data Analytics Function (NWDAF) of the communications network, receiving, from one or more first network functions of the communication network, information relating to traffic data with a known classification; and developing a model for classifying future traffic data based on the information relating to the traffic data with a known classification;
   at a second network function of the communications network, storing a representation of the developed model;
   at a third network function of the communications network, receiving the representation of the developed model from the second network function; and
   installing the representation of the developed model at a fourth network function of the communications network; and
   at the fourth network function, classifying traffic data using the developed model.

2. The method of claim 1, wherein the method further comprises, at the NWDAF, receiving a request, from a fifth network function of the communications network, for a model for classifying future traffic data.

3. The method of claim 1, wherein the request for a model for classifying future traffic data further comprises information identifying an application for which future traffic data is to be classified.

4. The method of claim 3, wherein the request for a model for classifying future traffic data further comprises an accuracy indicator, wherein the accuracy indicator represents a minimum likelihood for the developed model to correctly classify future traffic data for the application.

5. The method of claim 1, wherein the one or more first network functions comprise at least one of the following: a unified data repository (UDR) arranged to store user subscription data; a user plane function (UPF) arranged to handle user data traffic, or a network exposure function (NEF) arranged to interact with application functions (AFs) external to the communications network.

6. The method of claim 1, wherein the information relating to traffic data with a known classification comprises at least one preexisting rule describing the traffic data with a known classification.

7. The method of claim 1, wherein the information relating to traffic data with a known classification comprises raw traffic data with a known classification.

8. The method of claim 1, wherein the method further comprises, at the NWDAF, determining an accuracy measure for the developed model, wherein the accuracy measure indicates a likelihood that the developed model correctly classifies future traffic data.

9. The method of claim 8, wherein the accuracy measure indicates the likelihood that the developed model correctly classifies future traffic data for a particular application.

10. The method of claim 8, wherein the representation of the developed model also includes the determined accuracy measure for the developed model.

11. The method of claim 1, wherein the representation of the developed model also includes information relating to an application for which future traffic data is to be classified by the model.

12. The method of claim 1, wherein the representation of the developed model also includes metadata relating to the developed model.

13. The method of claim 1, wherein the method further comprises, at the NWDAF, notifying the fifth network function that the model has been developed.

14. The method of claim 1, wherein the step of developing the model for classifying future traffic data based on the information relating to the traffic data with a known classification comprises developing the model using a machine-learning technique.

15. The method of claim 1, wherein:
the communications network is a 5G network;
the second network function is a unified data repository (UDR) arranged to store user subscription data;
the third network function is a session management function (SMF) arranged to manage user data sessions; and
the fourth network function is a user plane function (UPF) arranged to handle user data traffic.

16. A system for classifying traffic data in a communications network, the system comprising:
one or more data processing and control units arranged to execute computer-readable instructions associated with the following network functions of the communications network: a Network Data Analytics Function (NWDAF), a second network function, a third network function, and a fourth network function,
wherein execution of the instructions configures the system to perform operations corresponding to the method of claim 1.

17. The system of claim 16, wherein:
the communications network is a 5G network;
the second network function is a unified data repository (UDR) arranged to store user subscription data;
the third network function is a session management function (SMF) arranged to manage user data sessions; and
the fourth network function is a user plane function (UPF) arranged to handle user data traffic,
the one or more first network functions include one or more the following: the UDR, the UPF or another UPF, and a network exposure function (NEF) arranged to interact with application functions (AFs) external to the communications network.

18. A non-transitory, computer readable medium storing computer-executable instructions associated with a system comprising a Network Data Analytics Function (NWDAF), a second network function, a third network function, and a fourth network function of a communications network, wherein execution of the instructions by one or more data processing and control units causes the system to perform operations corresponding to the method of claim 1.

* * * * *